United States Patent [19]
Zimmermann et al.

[11] Patent Number: 4,802,948
[45] Date of Patent: Feb. 7, 1989

[54] APPARATUS FOR PRODUCING INTERIOR TRIM COMPONENT FOR A MOTOR VEHICLE

[75] Inventors: Willibald Zimmermann, Cologne; Klaus Hartmann; Heinz Wessel, both of Gladbach, all of Fed. Rep. of Germany

[73] Assignee: Ford Motor Company, Dearborn, Mich.

[21] Appl. No.: 938,184

[22] Filed: Dec. 5, 1986

Related U.S. Application Data

[62] Division of Ser. No. 813,304, Dec. 24, 1985, Pat. No. 4,781,956.

[30] Foreign Application Priority Data

Jan. 17, 1985 [DE] Fed. Rep. of Germany ....... 3001354

[51] Int. Cl.$^4$ ............................................. B32B 31/20
[52] U.S. Cl. .................................... 156/500; 156/566; 156/569; 156/570; 156/580; 156/581; 425/412; 425/436 R; 271/18.3; 271/117; 271/226; 414/222; 414/225; 414/751
[58] Field of Search ............... 156/245, 500, 569, 570, 156/566, 580, 581, 583.91, 556, 558; 425/412, 419, 344, 346, 347, 404, 412, 413, 436 R, 519; 414/222, 225, 751; 271/18, 18.3, 117, 226; 264/113, 119, 120, 250, 257, 293

[56] References Cited

U.S. PATENT DOCUMENTS

| | | | |
|---|---|---|---|
| 2,099,989 | 11/1937 | Osborn | 428/172 X |
| 2,131,728 | 10/1938 | Denman | 428/165 X |
| 2,303,195 | 11/1942 | Buff | 428/165 X |
| 2,322,226 | 6/1943 | Cunnington | 428/172 X |
| 2,550,455 | 4/1951 | Davies | 428/165 X |
| 2,616,823 | 11/1952 | Weymouth | 428/165 X |
| 2,699,416 | 1/1955 | Lyijynen et al. | 428/165 X |
| 3,046,179 | 7/1962 | Stallard | 156/274.4 X |
| 3,047,451 | 7/1962 | Beck et al. | 156/219 |
| 3,052,587 | 9/1962 | Spieles | 156/220 |
| 3,257,252 | 6/1966 | Keel | 156/79 |
| 3,361,610 | 1/1968 | Hannes | 428/174 X |
| 3,374,045 | 3/1968 | Mance et al. | 156/219 X |
| 3,429,728 | 2/1969 | Goldstone et al. | 428/174 |
| 3,596,322 | 8/1971 | Swezey | 425/436 |
| 3,825,642 | 7/1974 | Kies | 264/120 |
| 3,964,953 | 6/1976 | Mitchard et al. | 156/570 |
| 4,043,729 | 8/1977 | Paracchi | 425/412 |
| 4,131,664 | 12/1978 | Flowers et al. | 264/113 |
| 4,245,630 | 1/1981 | Lloyd et al. | 428/172 X |
| 4,248,163 | 2/1981 | Caughey et al. | 264/119 |
| 4,473,425 | 9/1984 | Baughman et al. | 156/566 |
| 4,519,766 | 5/1985 | Spengler | 425/413 |
| 4,580,964 | 4/1986 | Repella | 414/751 |
| 4,609,519 | 9/1986 | Pichard et al. | 264/120 |

FOREIGN PATENT DOCUMENTS

2937399 4/1981 Fed. Rep. of Germany.
3233675 3/1984 Fed. Rep. of Germany.

OTHER PUBLICATIONS

P. 318, The Title Page and Verso of the Title Page, Webster's Seventh New Collegiate Dictionary, G. C. Merriam Company, Publishers, Springfield, Mass., U.S.A.

*Primary Examiner*—Caleb Weston
*Attorney, Agent, or Firm*—Peter D. McDermott; Roger L. May

[57] ABSTRACT

An interior trim component 1 for a motor vehicle comprises a base 2 of a fibrous base material of approximately 80% wood fibers and approximately 20% synthetic resin fibers, which is compressed and consolidated by the action of pressure and heat into the desired shape. Padding and/or a fabric insert 5 may be placed over selected areas of the surface of the base 2 and a sheet 7 of plastic material is bonded over the whole of the visible side of the base 2, the parts of the plastic sheet 7 overlying the insert 5 having a continuous impressed separation so that they may be removed. The fibrous base material which is in the form of fibrous fleece mats of approximately 20 to 30 mm thickness is consolidatd in a hot-pressing shaping tool at 4000 N/M$^2$ and approximately 200° C. to a final thickness approximately one tenth the initial thickness, but is consolidated to a lesser extend in selected surface areas 4 to produce a greater final thickness between one fifth and two fifths the initial thickness, so as to provide a cushioning effect.

6 Claims, 5 Drawing Sheets

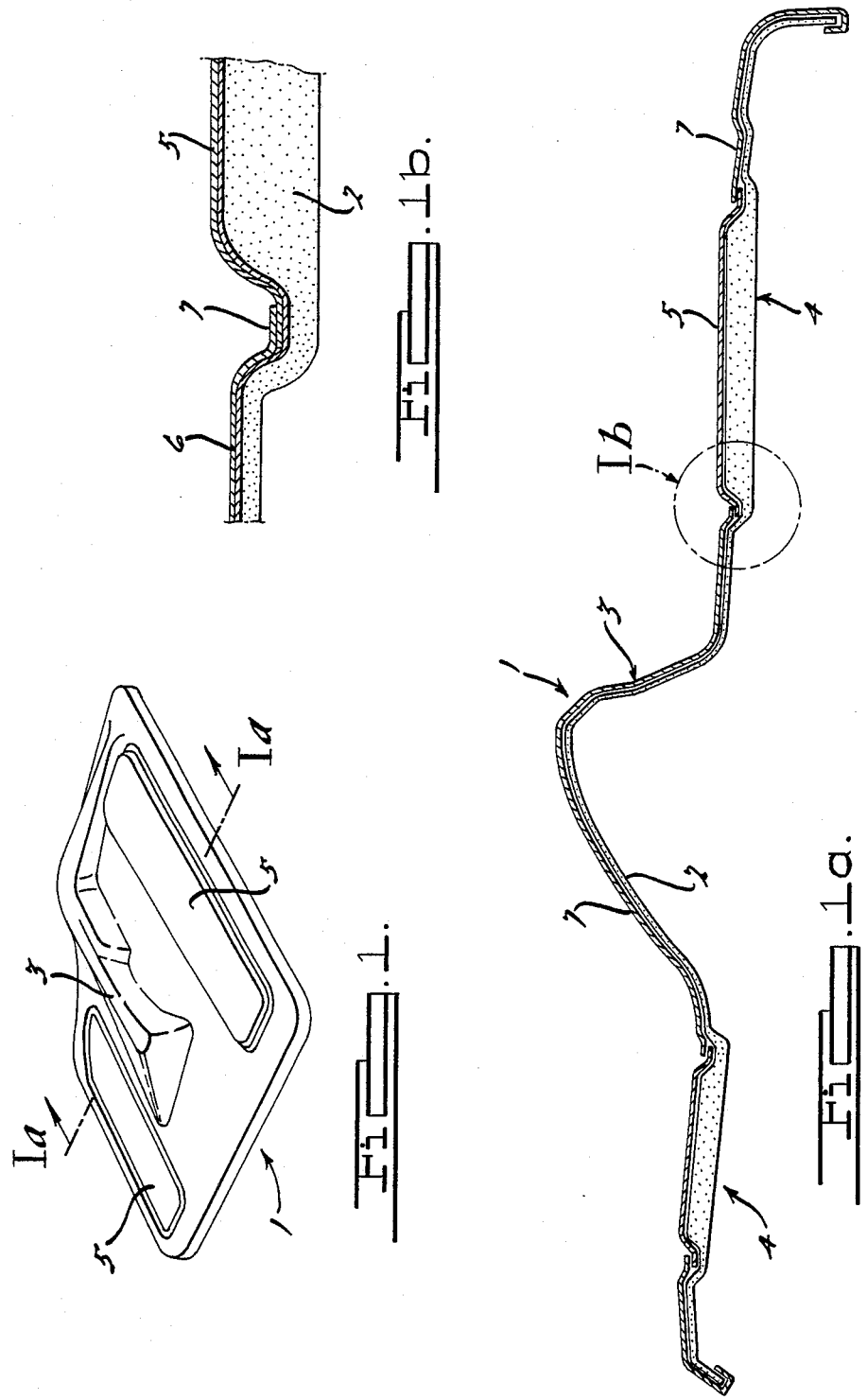

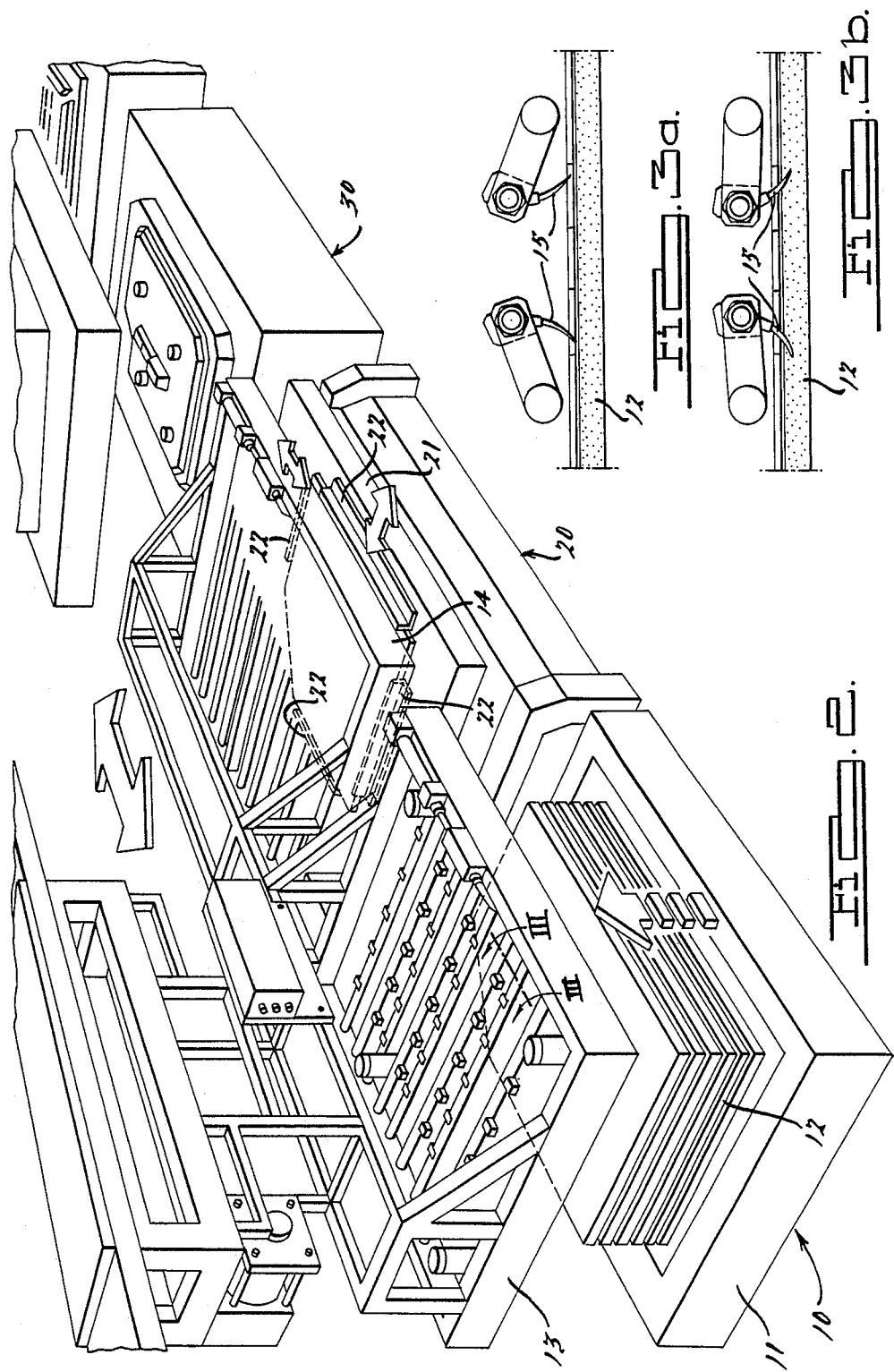

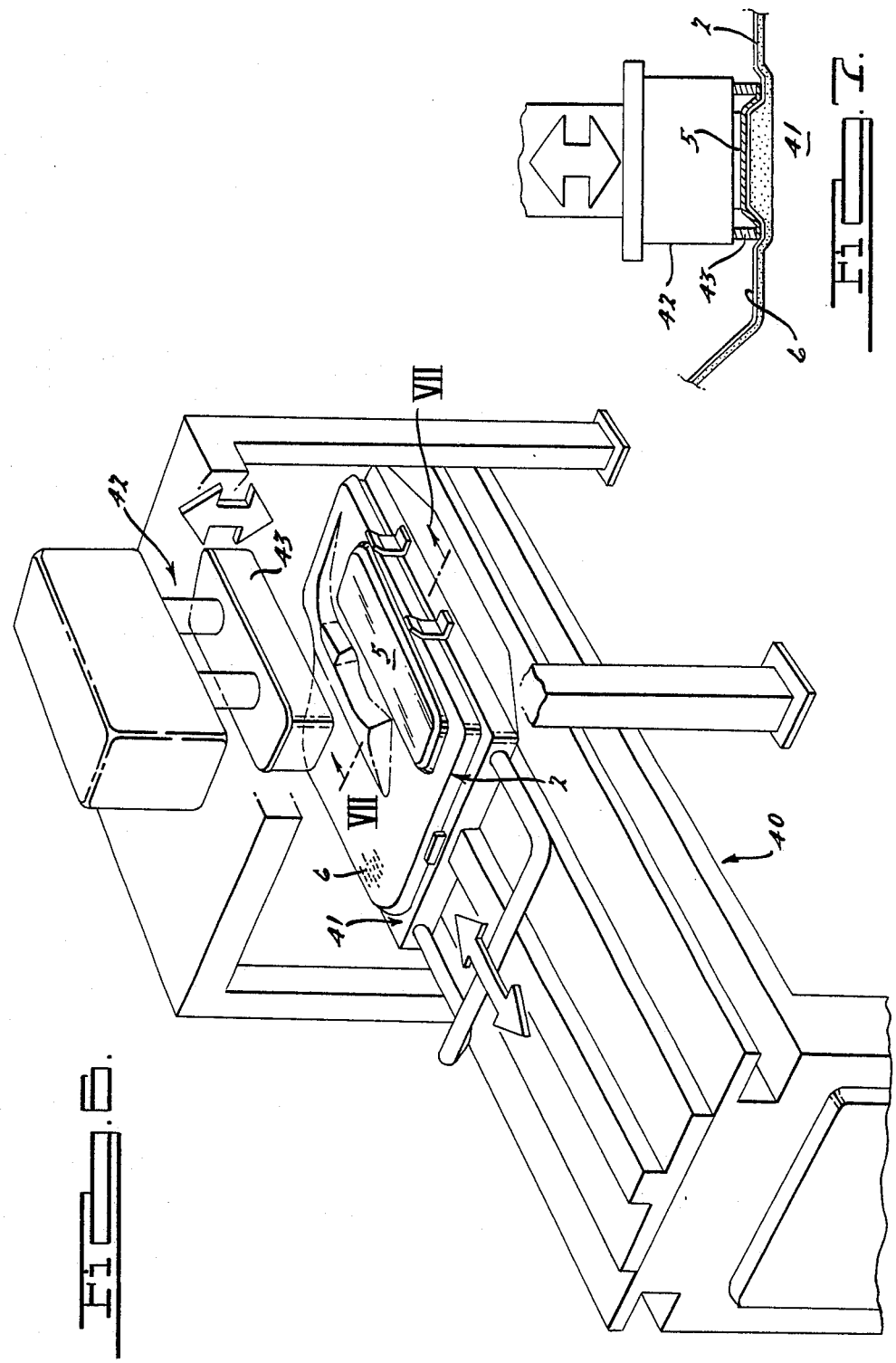

APPARATUS FOR PRODUCING INTERIOR TRIM COMPONENT FOR A MOTOR VEHICLE

This is a division of application Ser. No. 813,304, filed Dec. 24, 1985, now U.S. Pat. No. 4,781,956.

The invention relates to an interior trim component for motor vehicles of the type comprising a base of a fibrous base material which is pressed and consolidated by the action of pressure and heat into a desired shape.

An interior trim component for motor vehicles is known from DE-OS No. 29 37 399, the base of which is pressed and consolidated into the desired shape under the action of pressure and heat from a fibrous base material impregnated with binder. Here, a mixture of polyester and acrylic fibers, which are pressed together with a synthetic resin binder in the form of fibrous fleece mats, is selected as the fibrous base material. This known interior trim component has the disadvantage that on account of the high proportion of synthetic material fibers in the base material, it results in a very hard, rigid base which does not have the sound-proofing properties desired for an interior trim component of a motor vehicle.

A further interior trim component for motor vehicles is known from EP A No. 0 118 796, in which is disclosed a solution for a neat arrangement of the desired visible side of the interior trim having different coating materials in different surface areas. The differentiation which is indicated between different coating materials is provided for trim materials not capable of being welded, such as fabric or leather, but requires the difficult formation of deep channels in the base.

An interior trim component for motor vehicles is known from DE OS No. 32 33 675, in which a base, in a wet process, consists of an inherently stable pressed wood fiber material which is bonded with a plastic sheet in pre-selected surface area after padding and fabric inserts have been placed in position. In this case, the inherently stable wood fiber material should be directly provided with a structure for the thin plastic sheet by a hot-pressing shaping tool.

A further interior trim component for motor vehicles is known from EP A No. 0 053 747, in which a base is formed by a laminate of two fibrous fleece mats with an interposed piece of corrugated cardboard. A shaping apparatus for the interior trim component is described. This known interior trim component has the disadvantage that it cannot be shaped into any desired shape of varying depth on account of the piece of corrugated cardboard.

The present invention seeks to provide an improved interior trim component for motor vehicles of the type described above in such a way that it permits desired cushioning effects in pre-selected surface areas without the additional arrangement of strips of foam material.

In a separate aspect, the invention seeks to provide an apparatus for the convenient mass production of such an interior trim component.

According to a first aspect of the present invention, there is provided an interior trim component for a motor vehicle, comprising a compressed fiber base and a plastic sheet adhered to the surface of the base, wherein the base is formed by subjecting a fibrous mat to different degrees of compression in different areas, the mat thereby being only partially compressed in selected areas so that the base may exhibit a cushioning effect within the selected areas.

According to a second aspect of the invention, there is provided an interior trim component for a motor vehicle, comprising a base of a fibrous base material which is pressed and consolidated by the action of pressure and heat into the desired shape. A plastic sheet is bonded to the base to cover at least the surface of the component that is visible during use. The fibrous base material, prior to compression, is in the form of fibrous fleece mats of between 20 and 30 mm in thickness and is consolidated in a hot-pressing shaping tool at a pressure of 4000 N/M$^2$ and a temperature of 200° C. to a final thickness of approximately one tenth the initial thickness, the material being consolidated to a lesser extent in pre-selected surface areas to produce a greater final thickness of between two and four tenths the initial thickness, so as to provide a cushioning effect in such selected surface areas.

Preferably, the surface areas having a cushioning effect are covered with padding and/or fabric inserts and the plastic sheet material overlies only the surrounding areas of the base, the plastic sheet being provided with impressed separation seams to enable the removal of the parts of the sheet overlying the inserts. Conveniently, the padding and/or fabric inserts are secured to the base by hot sealing following the application to the entire surface of the base of a thermosetting adhesive for adhering the plastic sheet to the base. In this way, undesired shifting of the inserts is reliably avoided in the subsequent overall plastic material sheet.

In accordance with a further aspect of the invention, there is provided an apparatus for producing an interior trim component as set forth above, comprising a loading station, an aligning station, a shaping station and a sealing station arranged in succession. The apparatus is characterized in that the shaping station comprises a male mold disposed beneath a female mold, the two molds defining a gap of uneven thickness therebetween so that a fibrous mat arranged between the two molds is subjected to different degrees of compression in different areas of its surface.

BRIEF DESCRIPTION OF THE DRAWINGS

The invention will now be described further, by way of example, with reference to the accompanying drawings, in which:

FIG. 1 is a perspective view of an interior trim component according to the invention;

FIG. 1a is a section along the line Ia—Ia in FIG. 1;

FIG. 1b is a section drawn to an enlarged scale of the detail contained in the circle Ib in FIG. 1a;

FIG. 2 is a perspective view of an apparatus for the substantially automatic production of the interior trim component of FIG. 1;

FIG. 3a shows pin grippers of the apparatus in FIG. 2 in their rest position;

FIG. 3b shows the pin grippers of FIG. 3a in their operating position;

FIG. 6 is a perspective view of the sealing station; and

FIG. 7 is a vertical section through the region of the sealing punch.

Figure 4:
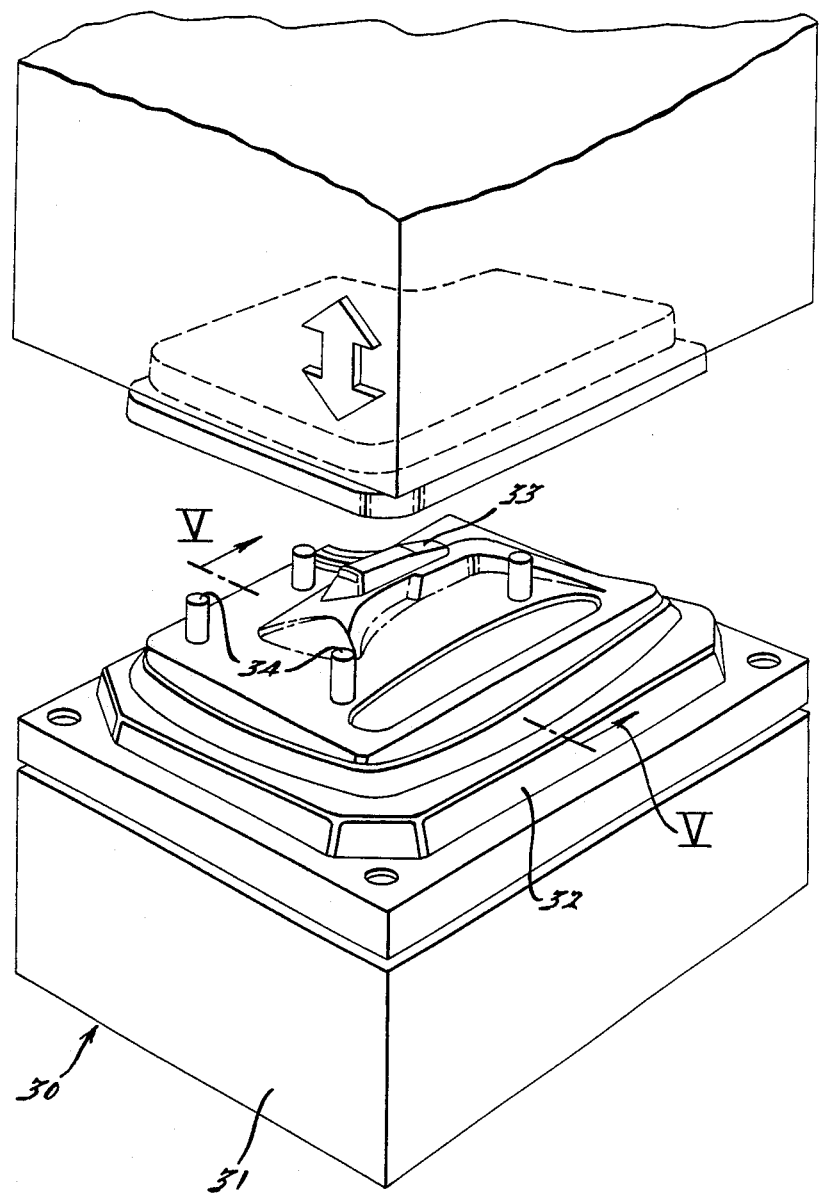
FIG. 4 is a perspective view of the hot shaping tool with the advancing member and ejectors moved out.

The interior trim component 1 illustrated in FIG. 1 is intended for the door of a motor vehicle. The interior trim component 1 comprises a base 2 which is pressed and consolidated by the action of pressure and heat into the desired shape from a fibrous material of approximately 80% wood fibers and approximately 20% synthetic resin fibers. The maximum deformation of the base 2 is required in the region of the arm rest 3. Above the arm rest 3, in a preselected surface area 4 in which a padding and/or fabric insert 5 is to be provided, the base 2 is less compressed so that in this area a cushioning effect is achieved by the less compressed material from which the base 2 is formed.

The base 2 produced in this way is coated all over with a thermosetting adhesive 6 which is necessary for the intended overall bonding to a plastic sheet 7. Padding and/or material inserts 5 of desired shape can be positioned on the surface areas 4 provided and by the action of the adhesive 6 can be secured by hot sealing using a sealing punch corresponding to the peripheral shape of the inserts. The base 2 is then covered with the plastic sheet 7 which is bonded to the entire remaining surface of the base 2 in a manner known per se. Appropriate ornamental strips and the like may be provided.

The manual handling of the fibrous fleece mats is difficult on account of their soft nature, and in the past has led to widely differing positionings in the tool, as a result of which increased wastage and rejects arose. In the preferred embodiment described now with reference to FIGS. 2 to 7, a loading station 10 and an aligning station 20 are arranged upstream of a shaping station 30. A sealing station 40 is arranged downstream of the shaping station.

The loading station 10 comprises a support surface for stacks of fibrous fleece mats 12 supplied on conveying pallets 11. A first loading frame 13 is disposed above the stack of fibrous fleece mats 12 and a second loading frame 14, parallel to the first loading frame 13, is disposed above the aligning station 20. The two loading frames 13 and 14 can be raised and lowered independently of one another and are continuously movable laterally in a parallel manner.

Each loading frame 13 and 14 is provided with a plurality of pin grippers 15 (FIGS. 3a and 3b) which can be swung in opposite directions toward one another and which allow a fibrous fleece mat 12 to be raised individually from the stack of the loading station 10 or a fibrous fleece mat 12 to be deposited in the aligning station 20 or in the shaping station 30, respectively.

The aligning station 20 comprises a supporting plate 21 on which are provided a plurality of displaceable alignment rails 22 which cooperate with the edges of the fibrous fleece mat 12 to align the mat with the mold. The frame 13 acts to transfer the mats from the stack to the alignment station and the frame 14 moves the mats after they have been aligned from the alignment station to the shaping station.

The shaping station 30, better shown in FIG. 4, consists of a press bed 31 on which a male mold 32 having the shape of the rear of the base 2 is disposed in conventional manner. The male mold 32 includes a pressure actuated advancing member 33 in the region of the base 2 in which the greatest degree of deformation is to take place. When the fibrous fleece mat 12 is introduced into the mold by the second frame 14, the flexible fibrous fleece mat 12 is laid in the position shown in FIG. 5a with an exaggerated bulge in the region of maximum deformation.

Figure 5A:
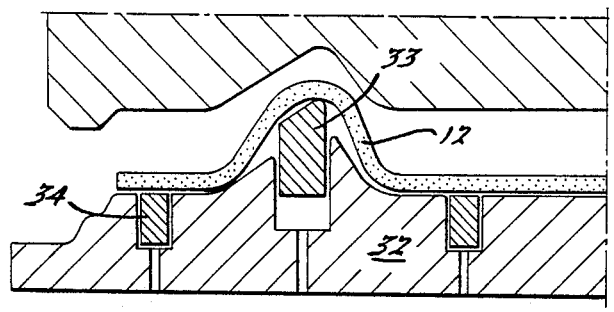
FIG. 5a is a vertical section, along line V—V in FIG. 4, through the shaping tool with the fibrous fleece mat, which bulges forward, inserted.
Figure 5B:
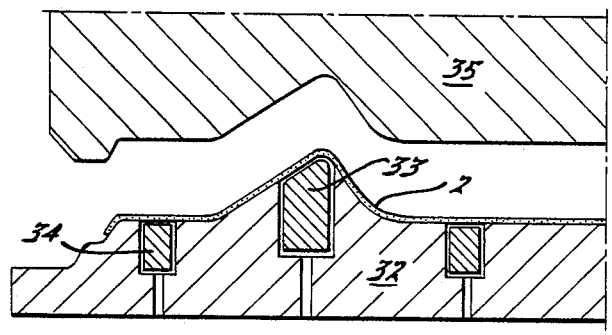
FIG. 5b is a section similar to 5a after the shaping procedure has been carried out.
Figure 5C:
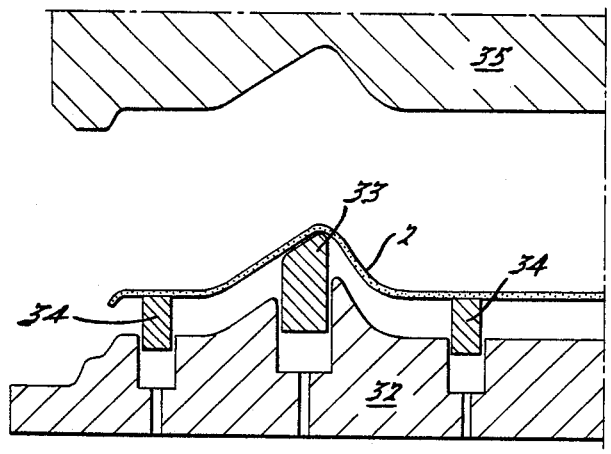
FIG. 5c a view similar to FIG. 5a with the ejectors actuated.

When the shaping tool is closed by the female mold 35, the advancing member 33 is first retracted and then the fibrous fleece mat 12 is consolidated by the action of pressure and heat into the shape shown in FIG. 5b. The finished base 2 is subsequently ejected by actuation of the ejectors 34 and the advancing member 33 which likewise acts as an ejector. The base may now be removed from the mold.

The shaped base 2 can now be transferred using a conventional conveying device past a spraying device which covers it with an overall coating of a thermosetting adhesive 6. The base 2 coated in this way with the adhesive 6 can now be loaded in the sealing station 40 (see FIG. 6) which essentially comprises a receiving member 41 for the shaped base and a sealing punch 42 with a peripheral electrode 43, the shape of which corresponds to the area of the padding and/or fabric insert 5 to be placed in position.

The arrangement of apparatus for producing an interior trim component according to the invention ensures a friction-free and substantially automatic manufacture of such interior trim components with the minimum of material wastage and rejects.

We claim:

1. An apparatus for producing an interior trim component for a motor vehicle, said component comprising a compressed fiber base and a plastic sheet adhered to at least selected areas of a surface thereof, wherein selected portions of said base are less compressed and thicker than remaining portions of said base, said apparatus comprising a loading station followed by an alignment station followed by a shaping station followed by a sealing station, said shaping station comprising a male mold member and an opposed female mold member, said mold members being moveable relative one another into a closed position defining a gap between them of uneven thickness, whereby in said closed position said mold members are adapted to subject selected areas of a fibrous mat of substantially uniform thickness to different degrees of compression than remaining areas of said mat, and wherein said loading station comprises a first loading frame, a second loading frame and a support surface adapted to support a stack of fibrous mats, each of said loading frames comprising means for releasably gripping a fibrous mat to transport same and being vertically moveable independently of the other, said first loading frame being reciprocally moveably horizontally from a first position over said support surface to a second position over said alignment station, said second loading frame being reciprocally moveable horizontally from a first position over said alignment station to a second position over said shaping station.

2. The apparatus of claim 1, wherein said gripping means comprises a plurality of sets of oppositely disposed, reciprocally moveable pins.

3. The apparatus of claim 1, wherein said alignment station comprises a plurality of moveable rails adapted to contact edges of said fibrous mat.

4. An apparatus for producing an interior trim component for a motor vehicle, said component comprising a compressed fiber base and a plastic sheet adhered to at least selected areas of a surface thereof, wherein selected portions of said base are less compressed and thicker than remaining portions of said base, said apparatus comprising a loading station followed by an alignment station followed by a shaping station followed by a sealing station, said shaping station comprising a male mold member and an opposed female mold member, said mold members being moveable relative one another into a closed position defining a gap between them of uneven thickness, whereby in said closed position said mold members are adapted to subject selected areas of a fibrous mat of substantially uniform thickness to different degrees of compression than remaining areas of said mat, and wherein said male mold member comprises a moveable advancing member adapted to contact and displace a region of said fibrous mat prior to compression molding thereof and to provide a portion of the surface of said male mold during such compression molding.

5. The apparatus of claim 4, wherein said male mold member further comprises a moveable ejector adapted to facilitate removal of said fibrous mat from said shaping station.

6. An apparatus for producing an interior trim component for a motor vehicle, said component comprising a compressed fiber base and a plastic sheet adhered to at least selected areas of a surface thereof, wherein selected portions of said base are less compressed and thicker than remaining portions of said base, said apparatus comprising a loading station followed by an alignment station followed by a shaping station followed by a sealing station, said shaping station comprising a male mold member and an opposed female mold member, said mold members being moveable relative one another into a closed position defining a gap between them of uneven thickness, whereby in said closed position said mold members are adapted to subject selected areas of a fibrous mat of substantially uniform thickness to different degrees of compression than remaining areas of said mat, and wherein said sealing station comprises (a) a receiving member adapted to register with a fibrous mat shaped by said shaping station, and (b) a sealing punch reciprocally moveable relative said receiving member and having a sealing electrode adapted to contact said shaped fibrous mat on said receiving member in a preselected pattern.

* * * * *